June 1, 1965 S. SHARKO 3,186,212
ANNULAR RING SUCTION CUP TESTING AND HOLDING MEANS
Filed Dec. 15, 1959
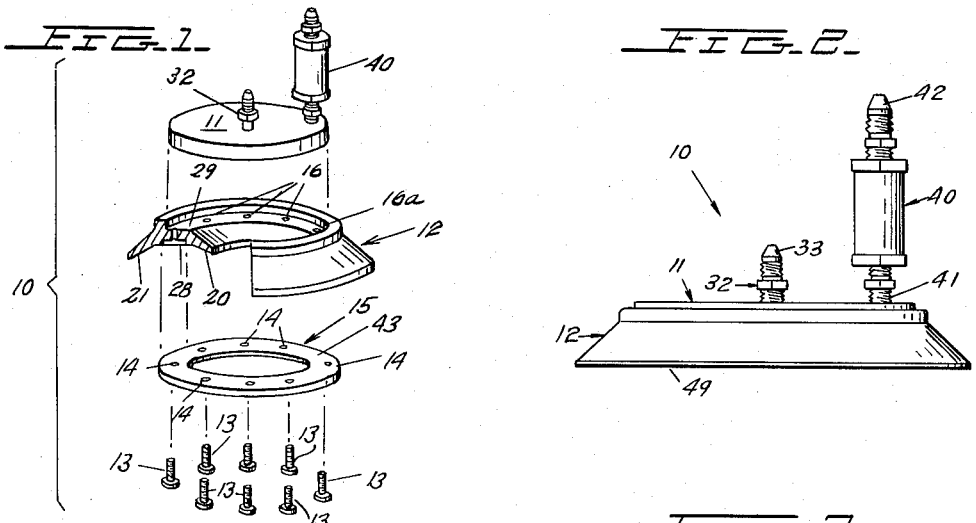
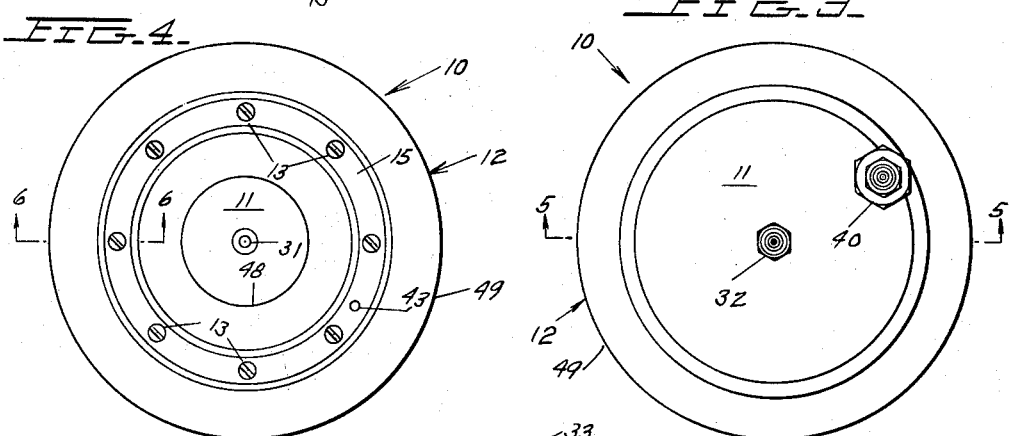
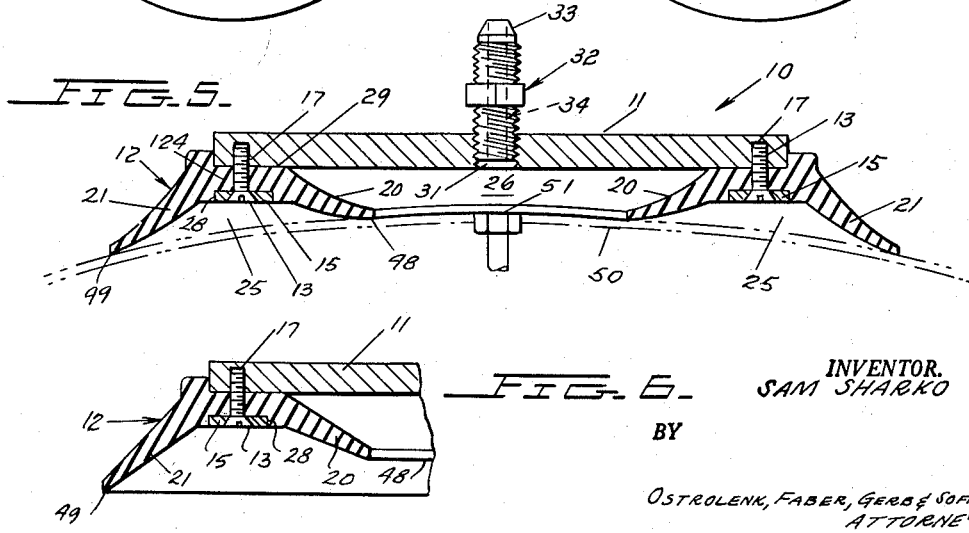
INVENTOR.
SAM SHARKO
BY
OSTROLENK, FABER, GERB & SOFFEN
ATTORNEYS

United States Patent Office 3,186,212
Patented June 1, 1965

3,186,212
ANNULAR RING SUCTION CUP TESTING AND
HOLDING MEANS
Sam Sharko, Bayside, N.Y., assignor to Intercontinental
Dynamics Corporation, Englewood, N.J., a corporation
of New Jersey
Filed Dec. 15, 1959, Ser. No. 859,652
1 Claim. (Cl. 73—4)

This invention relates to fittings for test devices of the type which subject a portion of the apparatus under test to a controlled pressure differing from ambient pressure in order to simulate actual operating conditions.

Various airborne instruments include pressure sensitive means. For ground testing the instruments, in order to test the static system for leakage and also to simulate high altitude conditions of static pressure, it is necessary to subject the pressure sensitive means to pressure below ambient. Conversely, when the instruments are being ground tested in an elevated area, say Denver, Colo. in order to simulate sea level conditions it is necessary to subject the pressure sensitive means to pressures exceeding ambient.

In a typical airborne instrument, such as an altimeter, which utilizes an aneroid capsule as a pressure sensing means, the ground testing thereof at sea level or close thereto is accomplished by utilizing a suction cup means to cover the static pressure port of the altimeter. A vacuum is then drawn in the suction cup and communicated to the static pressure port.

It has been found that, due to forces exerted on the suction cup hose or for other reasons, after the vacuum has been drawn the suction cup often moves out of place and the pressure sensing means is then abruptly subjected to ambient pressure. While the diaphragm of the capsule in the instrument under test can withstand changes in pressure extending over a wide range, the diaphragm is not constructed to withstand abrupt high amplitude changes in pressure. Further, in a differential pressure sensing instrument such as a machmeter, which also includes an outlet at high pressure (Pitot pressure), the removal of suction from the static port may put a reverse pressure on the differential pressure capsule which will destroy this capsule or its connecting mechanism.

The device of the instant invention overcomes this difficulty by providing two individual suction cups with one of the cups being placed within the other. A flexible loop member of trough-shaped cross-section having diverging walls defines the outer cup while a plate cooperating with the inner wall of the loop member defines the inner cup. The loop is preferably circular although it may readily be formed in any shape convenient for a particular application.

For testing an instrument the inner cup is placed over the static pressure port of the instrument and is provided with a fitting connectible to a low pressure source. The space between the inner and outer cups is also provided with a check valve means connectible to a low pressure source.

Under usual test conditions the low pressure source communicates with the inner cup. Due to valve action of the inner cup annular lip, the outer cup also becomes evacuated. After the test is made and ground level pressure restored within the inner cup the outer cup is pinched to intentionally break the seal for removal of the device.

Accordingly, a primary object of this invention is to provide a novel fitting of the suction cup type which connects a test device to an airborne instrument.

Another object is to provide a suction cup type fitting which includes a closed loop suction cup.

Still another object is to provide a fitting of the suction cup type which comprises inner and outer suction cups with the inner suction cup being connected to a controlled pressure source and the outer suction cup being provided with a check valve adapted to be interposed between a low pressure source and the outer suction cup.

A further object is to provide a fitting of the suction cup type including an outer loop-shaped suction cup formed by a single resilient member and an inner suction cup formed by the inner wall of the resilient member and a rigid plate member.

These as well as other objects of the instant invention shall become readily apparent after studying the following description of the accompanying drawings in which:

FIGURE 1 is an exploded perspective of the novel fitting comprising the instant invention.

FIGURE 2 is a side elevation of the fitting of FIGURE 1.

FIGURE 3 is a top view of the fitting of FIGURE 2.

FIGURE 4 is a bottom view of the fitting of FIGURE 2.

FIGURE 5 is a longitudinal cross-section of the fitting of FIGURE 3 taken through line 5—5 looking in the direction of arrows 5—5, showing the fitting mounted to a curved surface.

FIGURE 6 is a fragmentary cross-section of the resilient loop-shaped member taken through line 6—6 of FIGURE 4 looking in the direction of arrows 6—6 with the member in a relaxed condition.

Now referring to the figures, fitting 10 comprises a circular plate 11 secured to member 12 by a plurality of machine screws 13 which pass through apertures 14 in clamping rings 15 as well as through apertures 16 of member 12 and are received by threaded recesses 17 of plate 11.

Member 12 is constructed of a resilient material, such as soft rubber, formed as a circular closed loop having a trough-shaped cross-section. The inner 20 and outer 21 walls of member 12 partially define outer annular region or suction cup 25. Inner region or suction cup 26 is defined by inner wall 20 in cooperation with plate 11. The intermediate portion 24 of member 12 which interconnects walls 20, 21 is provided with an annular groove 28 within which clamping ring 15 is disposed and a ledge 29 upon which plate 11 is seated. Screws 13 draw plate 11 toward member 12 to be firmly seated against ledge 29 with clamping ring 15 distributing the forces exerted by screws 13 so that a fluid tight connection is formed.

Plate 11 is preferably constructed of rigid material and is provided with a threaded aperture 31 which receives fitting 32 having a through passage 34. Fitting 32 is adapted to be connected through a suitable hose to a controlled source of pressure either higher or lower than ambient, as the case may be, as will be hereinafter explained.

Plate 11 is also provided with an aperture (not shown) to receive the entrance end 41 of check valve 40. The plate aperture for entrance end 41 is in alignment with aperture 43 (FIGURE 4) of clamping ring 15 which is also aligned with aperture 16a extending through member 12.

The exit end 42 of check valve 40 is adapted to be connected to a source whose pressure is below that of ambient pressure. Check valve 40 includes a passage, connecting entrance 41 to exit 42, which is open when the pressure at entrance 41 exceeds the pressure at exit 42.

In operation fitting 10 is pressed against the fuselage 50 (FIGURE 5) of an airplane with inner suction cup 26 positioned over static pressure port 51. Fitting 10 is forced against fuselage 50 forcing the annular edges 48, 49 at the free ends of suction cup walls 20, 21, respectively, in diverging directions so as to reduce the volume within outer suction cup 25. This temporarily holds fitting 10 to fuselage 50.

For testing at or near sea level with the static pressure port 51 to be subjected to pressure below that of ambient, end 33 of fitting 32 is connected to a controlled source of low pressure. The inward flared shape of wall 20 causes this low pressure to be communicated to outer suction cup 25 as well as inner suction cup 26 so that fitting 10 is clamped more firmly against fuselage 50. During the preceding operation check valve 40 need not be connected to a pressure source since the pressure at exit 42 exceeds the pressure at entrance 41 causing valve 40 to be closed at this time.

For testing at elevated ground locations when sea level conditions are to be simulated, low pressure is first introduced to exit 42 of check valve 40 to establish seals at annular edges 48, 49 of member 12. Testing then proceeds by introducing pressures above ambient at end 33 of fitting 32 with the above ambient pressure reaching static pressure port 51 through passage 34 and inner suction cup 26.

In practice, check valve exit 42 is connected to a pressure source at least 4 p.s.i. lower than ambient. The forcing of fitting 10 against fuselage 50 squeezes out air from annular suction cup 25 so that fitting 10 will remain clamped by suction so long as there are no leaks under annular edges 48, 49. If low pressure is applied to static pressure port 51 the low pressure will maintain fitting 10 in position despite a small amount of leakage passed edges 48, 49. Under these conditions inner lip 48 rises to admit air to the inner suction cup 25 should any air leak in through outer lip 49.

The construction of check valve 40 prevents air from entering at valve 40. In practice it has been found that check valve 40 need not be connected to a vacuum source when making positive pressure tests of up to 5" of mercury, in the case of a smooth aircraft skin.

It is to be noted that inner wall 20 is shorter than outer wall 21 to facilitate mounting to a curved surface. The outward flaring of walls 20, 21 at the free ends thereof also aids in mounting of fitting 10.

Thus, this invention provides a novel construction for a fitting used in connection with the application of vacuum or pressure to the flush static port of an airplane for the purposes of testing the static system for leakage and/or testing the pressure instruments connected to this system. The fitting is essentially an annular suction cup whose inner region also defines a suction cup. The fitting effectively connects the airplane static system to a source of vacuum or of pressure, as the case may be, and seals off atmospheric pressure while holding the fitting against the skin of the airplane.

Although I have here described preferred embodiment of my novel invention, many variations and modifications will now be apparent to those skilled in the art, and I therefore prefer to be limited, not by the specific disclosure herein, but only by the appending claim.

I claim:

In a device of the class described, a member formed as a closed loop having a trough-like cross-section and constructed of resilient material; said member having an inner wall, an outer wall, and an intermediate wall joining said inner and said outer walls; a rigid disk; means providing a fluid tight connection securing said plate to said member at its said intermediate wall; said disk and said inner wall defining a first region; the walls of said member defining a second region; means secured to said disk and having a passage communicating with said first region and adapted to be connected to a first controlled pressure source; check valve means secured to said disk and including an entrance communicating with said second region; said check valve means also including an exit and a passage interconnecting said exit to said entrance when said check valve means is open; said check valve means being open when pressure within said second region exceeds pressure at said exit; said inner wall being of lesser height than said outer wall to facilitate mounting upon a curved surface; said first and said second walls being oppositely flared and being most widely spaced along their free ends; said second region being of a substantial volume as compared to the volume of the first region.

References Cited by the Examiner

UNITED STATES PATENTS

| | | | |
|---|---|---|---|
| 963,060 | 7/10 | Noppel | 248—206 X |
| 2,009,721 | 7/35 | Williams | 248—362 X |
| 2,319,727 | 5/43 | Duggan | 248—206 |
| 2,752,914 | 7/56 | Pohlman | 248—362 X |
| 2,897,669 | 8/59 | Villiers et al. | 73—4 |
| 2,910,264 | 10/59 | Lindenberger | 248—362 |

ISAAC LISANN, *Primary Examiner.*